United States Patent
Shi et al.

(10) Patent No.: US 10,723,851 B2
(45) Date of Patent: Jul. 28, 2020

(54) HIGH PERFORMANCE ANTI-DRIPPING AGENT USED IN GREENHOUSE FILM

(71) Applicant: Dow Global Technologies LLC, Midland, MI (US)

(72) Inventors: Qing Shi, Shanghai (CN); Hongliang Zhang, Shanghai (CN); Hongyu Chen, Zhanjiang (CN); Hong Zheng, Songjiang (CN); Yong Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 55 days.

(21) Appl. No.: 15/750,390

(22) PCT Filed: Sep. 18, 2015

(86) PCT No.: PCT/CN2015/089985
§ 371 (c)(1),
(2) Date: Feb. 5, 2018

(87) PCT Pub. No.: WO2017/045198
PCT Pub. Date: Mar. 23, 2017

(65) Prior Publication Data
US 2018/0230280 A1     Aug. 16, 2018

(51) Int. Cl.
| | | |
|---|---|---|
| *C08J 5/18* | (2006.01) | |
| *C08L 23/08* | (2006.01) | |
| *C09D 163/00* | (2006.01) | |
| *A01G 9/14* | (2006.01) | |
| *C08L 23/06* | (2006.01) | |
| *C08L 71/02* | (2006.01) | |
| *A01G 13/02* | (2006.01) | |

(52) U.S. Cl.
CPC .............. *C08J 5/18* (2013.01); *A01G 9/1438* (2013.01); *A01G 13/02* (2013.01); *C08L 23/06* (2013.01); *C08L 23/08* (2013.01); *C08L 23/0846* (2013.01); *C08L 71/02* (2013.01); *C09D 163/00* (2013.01); *C08G 2650/58* (2013.01); *C08J 2323/06* (2013.01); *C08J 2371/02* (2013.01); *C08L 2207/066* (2013.01)

(58) Field of Classification Search
CPC . C08L 23/00–36; C08L 71/00–14; C08J 5/18; C08J 2471/00–14; C08J 2323/00–36; C08K 3/01; C08K 3/017; C08K 5/10; C08G 65/2609; A01G 9/1438
See application file for complete search history.

(56) References Cited

U.S. PATENT DOCUMENTS

| | | | | |
|---|---|---|---|---|
| 3,048,265 | A | * 8/1962 | Hackhel | ................ C08J 7/065 426/129 |
| 6,784,235 | B2 | 8/2004 | Gupta et al. | |
| 8,207,070 | B2 | 6/2012 | Li et al. | |
| 2006/0167153 | A1 | 7/2006 | Schneider et al. | |

FOREIGN PATENT DOCUMENTS

| | | |
|---|---|---|
| CN | 102660047 A | 9/2012 |
| CN | 104231385 A | 12/2014 |
| CN | 104448500 A | 3/2015 |
| EP | 0931805 A1 | 7/1999 |
| EP | 2216362 A1 | 8/2010 |
| JP | 201022056 A | 1/2010 |

OTHER PUBLICATIONS

PCT/CN2015/089985, International Search Report and Written Opinion dated Jun. 22, 2016.
PCT/CN2015/089985, International Preliminary Report on Patentability dated Mar. 29, 2018.

* cited by examiner

*Primary Examiner* — Kregg T Brooks

(57) ABSTRACT

A film comprising, consisting of, or consisting essentially of:
a) a polyolefin component; b) an additive comprising
i) a first polyethylene oxide/polyethylene copolymer having a HLB value in the range of from 1 to 7 and a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$ wherein a is from 9 to 25 and b is from 1 to 10; and ii) a second polyethylene oxide/polyethylene copolymer having a HLB value in the range of from 7 to 18 and a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$ wherein a is from 9 to 25 and b is from 1 to 10, is disclosed. The film is used in greenhouse applications.

2 Claims, No Drawings

HIGH PERFORMANCE ANTI-DRIPPING AGENT USED IN GREENHOUSE FILM

FIELD OF THE INVENTION

The present invention is related to polyolefin films. More particularly, the present invention is related to polyolefin films used in greenhouse applications.

BACKGROUND

Dripping is a phenomenon commonly occurring due to temperature difference of the inside atmosphere and the outside atmosphere of an "enclosed body" and localized cooling at the interface. The atmosphere within greenhouses surrounded by agricultural film is saturated with water vapor which evaporates from the soil or from the plants, because the surface tension of water is very high (about 72 mN/m) and the surface energy of greenhouse films, which usually made from polyethylene (PE), ethylene-vinyl acetate (EVA) or polyvinylchloride (PVC), is low, the water vapor condenses dropwise on the inner surface of the cold film to cause water dripping. Water droplets on the film greatly reduce the incident sunlight due to irregular reflection and the droplets that fall on the plants can result in physical damage of the crops.

Therefore, to avoid dripping, anti-dripping treatments are used to make the inner surface of greenhouse films hydrophilic in nature or to reduce water surface tension by adding surfactants. Both methods can cause vapor condensed droplets to spread on the surface and drain away, assuring transmission of sunlight into the greenhouse and reducing physical damage to plants.

Currently, most of the anti-dripping films available on the market are incorporated with low molecular weight additives (e.g., nonionic surfactants such as sorbitan esters, polyoxyethylene esters, glycerol esters, and polyglycerol esters) which migrate from the bulk film matrix to the surface of the plastic films. These low molecular weight surfactants on the surface can dissolve in water and reduce water surface tension, so that the "modified water" can spread on the film. Typical anti-dripping additive concentration ranges from 1 to 5 weight percent. However, normally most of these commercially available surfactant additives do not have good affinity with non-polar polyethylene film matrices. These additives can diffuse out of the film quickly and be easily washed away from the film surface by condensed water, leading to reduced anti-dripping service time and the loss of the film's anti-dripping performance in a relatively short time.

Therefore, anti-dripping additives with a longer service time are desired.

SUMMARY OF THE INVENTION

One broad aspect of the present invention is a film comprising, consisting of, or consisting essentially of: a) a polyolefin component; b) an additive comprising
i) a first polyethylene oxide/polyethylene copolymer having a HLB value in the range of from 1 to 7 and a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$ wherein a is from 9 to 25 and b is from 1 to 10; and ii) a second polyethylene oxide/polyethylene copolymer having a HLB value in the range of from 7 to 18 and a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$ wherein a is from 9 to 25 and b is from 1 to 10.

DETAILED DESCRIPTION OF THE INVENTION

Component (a)—Polyolefin Component

The film comprises a polyolefin component. Examples of polyolefins include, but are not limited to polymers of monoolefins and diolefins, for example polypropylene, polyisobutylene, polybut-1-ene, poly-4-methylpent-1-ene, polyisoprene or polybutadiene, as well as polymers of cycloolefins, such as of cyclopentane or norbornene, polyethylene, for example, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), and linear low density polyethylene (LLDPE).

Mixtures of the above polyolefins can be used, for example mixtures of polypropylene with polyisobutylene, polypropylene with polyethylene (for example PP/HDPE) and mixtures of different types of polyethylenes (for example LDPE/HDPE).

Other examples of the polyolefin component include copolymers of monoolefins and diolefins with each other or with other vinyl monomers, for example ethylene/propylene copolymers, LLDPE, and mixtures thereof with LDPE, propylene/but-1-ene copolymers, propylene/isobutylene copolymers, ethylene/but-1-ene copolymers, ethylene/hexane copolymers, ethylene/methylpentene copolymers, ethylene/heptene copolymers, ethylene/octane copolymers, propylene/butadiene copolymers, isobutylene/isoprene copolymers, ethylene/alkyl methacrylate copolymers, ethylene/vinyl acetate copolymers and their salts as well as terpolymers of ethylene with propylene and a diene such as hexadiene, dicyclopentadiene or ethylidene-norbornene; and mixtures of such copolymers with each other and with other polymers mentioned above, such as for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and mixtures thereof.

The polyolefin component is typically present in the film in the range of from 90 to 99 weight percent. Any and all values between 90 and 99 weight percent are included herein and disclosed herein, for example, the polyolefin component can be 90, 90.2, 91, 92, 92.5, 93, 96, or 97 weight percent of the film.

Component (b)(i)—First PEO/PE Component

The additive is typically present in the film in the range of from 1 to 5 weight percent. Any value between 1 and 5 weight percent is included herein and disclosed herein, for example, the additive can be 1, 2, 2.4, 3, 3.5, 4, or 5 weight percent of the film. The additive comprises at least one first polyethylene oxide/polyethylene (PEO/PE) copolymer component. This copolymer generally has a structure selected from the group consisting of $CH_3CH_2(CH_2CH_2)_aCH_2CH_2(OCH2CH2)_bOH$ and $CH_3CH_2(CH_2CH_2)_aCO(OCH_2CH_2)_bOH$ wherein a is from 9 to 25 and b is from 1 to 10.

The Hydrophile-Lipophile Balance (HLB) value for the copolymer is calculated from the PEO content. For example, a polymer with no PEO component has a HLB value of zero and a PEO/PE copolymer having a PEO content of 20% has a HLB value of 4. The HLB value of the first polyethylene oxide/polyethylene copolymer is generally in the range of from 1 to 7. Any value within 1 and 7 is included herein and disclosed herein, for example, the HLB value can be 1, 2, 3, 4, 5, 6 or 7.

Examples of the PEO/PE component include, but are not limited to Unithox, available from Baker Hughes.

The first PEO/PE copolymer is generally present in the additive in the range of from 10 weight percent to 90 weight percent. Any and all ranges within 10 and 90 weight percent are included herein and disclosed herein; for example, the first PEO/PE copolymer can be present in the film in the range of 33 weight percent to 50 weight percent.

Component (b)(ii)—Second PEO/PE Copolymer (Surfactant)

In various embodiments, the additive further comprises a second additive comprising a PEO/PE copolymer. This copolymer generally has the same structure as the first additive.

The second PEO/PE copolymer generally has a higher ethylene oxide content compared to the first PEO/PE copolymer which gives it a higher HLB value. The HLB value for the second polyethylene oxide/polyethylene copolymer is generally in the range of from 7 to 18. Any value between 7 and 18 is included herein and disclosed herein, for example, the HLB value can be 7, 8, 9, 10, 11, 12, 13, 14, 15, 16, 17, or 18. The higher ethylene oxide content enables the second additive to modify water surface tension.

lated thiodiphenyl ethers, alkylidene bisphenols, benzyl compounds, acylaminophenols, esters of b-(3,5-di-tert-butyl-4-hydroxyphenyl)-propionic acid with monohydric or polyhydric alcohols, esters of b-(5-tert-butyl-4-hydroxy-3-methylphenyl)-propionic acid with monohydric or polyhydric alcohols, amides of b-(3,5-di-tert-butyl-4-hydroxyphenyl)-propionic acid and combinations thereof. In some embodiments uv stabilizers can be present in the film. Examples of uv stabilizers include but are not limited to 2-(2'-Hydroxyphenyl)-benzotriazoles, 2-hydroxy-benzophenones, esters of substituted benzoic acids, acrylates, malonates, sterically hindered amines, hydroxyphenyl-s-triazines, and combinations thereof.

Process for Producing the Composition

It is preferred that the multilayer films of the present invention be formed in the blown film process as is generally known in the art, although other methods such as cast films, or lamination can be used.

Examples

Raw Materials and Experiment:

All of the raw materials are shown in Table 1.

TABLE 1

Raw material information

| Component | Grade name | Characteristic | HLB value | Supplier |
|---|---|---|---|---|
| LLDPE | Dowlex ™ 2045 | Linear low density PE | — | Dow |
| LDPE | LDPE 143I | LDPE | — | Dow |
| EVA 15 | EVA 2060 | 15% VA content | — | Hanwha |
| C32-EO4 | Unithox ™ 420 | Polydispersed poor soluble PEO-PE with 20% EO content and 32 carbons chain in average | 4 | Baker Hughes |
| C50-EO5 | Unithox 720 | Polydispersed poor soluble PEO-PE with 20% EO content and 50 carbons chain in average | 4 | Baker Hughes |
| C32-EO10 | Unithox 450 | Polydispersed water soluble PEO-PE with 50% EO content and 32 carbons chain in average | 10 | Baker Hughes |
| C32-EO6 | Unithox 435 | Polydispersed water soluble PEO-PE with 35% EO content and 32 carbons chain in average | 7 | Baker Hughes |
| C18-EO4 | C18-EO4 | Monodispersed water soluble PEO-PE with 4 EO units and 18 carbons chain | 8.6 | Jiangsu Haian Chemical |
| C18-EO9 | C18-EO9 | Monodispersed water soluble PEO-PE with 9 EO units and 18 carbons chain | 12 | Jiangsu Haian Chemical |
| KF 650 | KF 650 | Comercial available anti-dripping agent usually used in EVA system | — | Riken |
| Ole-1G | Glyceryl monooleate | One commonly used anti-dripping composition | 3.5 | Jiangsu Haian Chemical |
| C18-EO2 | C18-EO2 | Monodispersed water soluble PEO-PE with 2 EO units and 18 carbons chain | 5.2 | Jiangsu Haian Chemical |
| LA-6 | LA-6 | Comercial available anti-dripping agent usually used in PE system | — | Zhejiang Lvyuan |
| FS | TS-403 | Florine based anti-fog agents | — | Taiwan Fengsheng |

The second PEO/PE copolymer is generally present in the additive in the range of from 10 weight percent to 90 weight percent. Any and all ranges within 10 and 90 weight percent are included herein and disclosed herein; for example, the second PEO/PE copolymer can be present in the film in the range of 50 weight percent to 67 weight percent.

Optional Components

In some embodiments, antioxidants can be present in the film. Examples of antioxidants include but are not limited to alkylated monophenols, alkylated hydroquinones, hydroxy- The notation 'CXX-EOY' denotes a compound with a certain number of carbon atoms and ethylene oxide repeat units. For example, the compound 'C32-EO4' has 32 carbon atoms and 4 ethylene oxide repeat units.

Film Preparation Process:

1. Compounding

First, the additives, including anti-dripping agents, anti-fog agents with LDPE powder were mixed using a high intensity mixer. Compounding was then carried out on a 27 mm twin-screw extruder. LLDPE was fed from one feeder and LDPE powder, along with all the other additives, was fed from another feeder. The temperature was set at around 180° C. and the screw speed was 250 rpm. The melt temperature was around 230° C. and the total output was 20 Kg/h.

2. Blown Film

The films were prepared on a monolayer blown film line with die diameter of 50 mm. The blown up ratio (BUR) was around 2.5. Film thickness was 60 um.

All the formulations are listed in Table 2. CE-1 to CE-9 are comparative examples with one anti-dripping component. CE-10 is comparative example containing 2 types of anti-dripping additives but does not contain PEO/PE copolymers with an HLB value lower than 7. CE-11 is a comparative example containing 2 types of anti-dripping additives. One is hydrophobic C32-EO4 (HLB=4) and another one is a commercially available anti-dripping agent KF650 with no PEO/PE. CE-12 and CE-13 are comparative examples containing hydrophobic C32-EO4 and hydrophobic esters, with no hydrophilic PEO/PE in the film.

IE-1 to 1E-10 are Inventive Examples containing 2 or more types of PEO/PE copolymers. There is one type of PEO/PE component with poor solubility and the HLB value is about 4 (e.g. C50-EO5 or C32-EO4, to increase film surface tension). And there are other types of water soluble PEO/PE components with the HLB values larger than 7 (e.g. C32-EO10, C18-EO9), to decrease the water surface tension.

TABLE 2

Formulations and Test Results of Anti-Dripping Films

| Sample ID | LLPDE | LDPE | EVA15 | Anti-dripping Additives Increase Film Surf. Tens. | | Anti-dripping Additives Decrease Water Surf. Tens. | | | |
|---|---|---|---|---|---|---|---|---|---|
| | | | | C50-EO5 | C32-EO4 | C32-EO10 | C32-EO6 | C18-EO9 | C18-EO4 |
| CE-1 | 72% | 25% | | 3.00% | | | | | |
| CE-2 | 72% | 25% | | | 3.00% | | | | |
| CE-3 | 72% | 25% | | | | 3.00% | | | |
| CE-4 | 72% | 25% | | | | | 3.00% | | |
| CE-5 | 72% | 25% | | | | | | 3.00% | |
| CE-6 | 72% | 25% | | | | | | | 3.00% |
| CE-7 | 72% | 25% | | | | | | | |
| CE-8 | | | 97% | | | | | | |
| CE-9 | 72% | 25% | | | | | | | |
| CE-10 | 72% | 25% | | | | 1.5% | | | |
| CE-11 | 72% | 25% | | | 1.5% | | | | |
| CE-12 | 72% | 25% | | | 1.5% | | | | |
| CE-13 | 72% | 25% | | | 1.5% | | | | |
| IE-1 | 72% | 25% | | | 2.25% | 0.75% | | | |
| IE-2 | 72% | 25% | | | 1.5% | 1.5% | | | |
| IE-3 | 72% | 25% | | | 1.5% | | | 1.5% | |
| IE-4 | 72% | 25% | | | 1.5% | | | | 1.5% |
| IE-5 | 72% | 25% | | 1.5% | | 1.5% | | | |
| IE-6 | 72% | 25% | | | 1% | 2% | | | |
| IE-7 | 72% | 25% | | | 1% | | | | 2% |
| IE-8 | 72% | 25% | | 1% | | 2% | | | |
| IE-9 | 72% | 25% | | | 1% | 1% | 1% | | |
| IE-10 | 72% | 25% | | | 1% | 1% | | | 1% |

| Sample ID | Anti-dripping Additives Decrease Water Surf. Tens. | | | | Anti-fog agents | | Anti-dripping @ 60° C. |
|---|---|---|---|---|---|---|---|
| | KF650 | Ole-1G | C18-EO2 | LA-6 | FS | Thickness | (Days) |
| CE-1 | | | | | 0.05% | 60 um | 5 |
| CE-2 | | | | | 0.05% | 60 um | 13 |
| CE-3 | | | | | 0.05% | 60 um | 14 |
| CE-4 | | | | | 0.05% | 60 um | 15 |
| CE-5 | | | | | 0.05% | 60 um | 6 |
| CE-6 | | | | | 0.05% | 60 um | 2 |
| CE-7 | 3.00% | | | | 0.05% | 60 um | 12 |
| CE-8 | 3.00% | | | | 0.05% | 60 um | 15 |
| CE-9 | | | | 3% | 0.05% | 60 um | 14 |
| CE-10 | | | | 1.5% | 0.05% | 60 um | 14 |
| CE-11 | 1.5% | | | | 0.05% | 60 um | 14 |
| CE-12 | | 2.5% | | | 0.05% | 60 um | 1 |
| CE-13 | | | 1.5% | | 0.05% | 60 um | 6 |
| IE-1 | | | | | 0.05% | 60 um | 27 |
| IE-2 | | | | | 0.05% | 60 um | 43 |
| IE-3 | | | | | 0.05% | 60 um | 22 |
| IE-4 | | | | | 0.05% | 60 um | 44 |
| IE-5 | | | | | 0.05% | 60 um | >>33 |
| IE-6 | | | | | 0.05% | 60 um | 51 |

TABLE 2-continued

Formulations and Test Results of Anti-Dripping Films

| | | | |
|---|---|---|---|
| IE-7 | 0.05% | 60 um | 24 |
| IE-8 | 0.05% | 60 um | 25 |
| IE-9 | 0.05% | 60 um | 33 |
| IE-10 | 0.05% | 60 um | 33 |

Film Accelerated Anti-Dripping Test:

The film anti-dripping performance was tested according to Chinese National Standard GB 4455-2006. The film is clamped on a cage of a water bath to form an enclosed space and there is a 15 degree slope angle of the film generated by a pressing cone. The water in the water bath is heated to 60° C. and the water vapor condenses and forms a thin layer of water on the film. Condensed water flows back to the water bath and normally the anti-dripping agent will be gradually washed away. Non-transparent water droplets and/or transparent water flakes/streams will form onto the inner surface of the film, resulting in the loss of anti-dripping performance.

The criteria of failure were set as:
1. Non-transparent water droplet area larger than 30% of the total film area.
2. The area with water flakes/streams larger than 50% of the total film area.

The anti-dripping service time was recorded (days) when the anti-dripping performance failed.

Results:

The anti-dripping performance of all the film samples is shown in Table 2.

Comparative Examples

Comparative examples CE-1 to CE-9 only contained one type of anti-dripping additive. The lifetime of one of benchmark anti-dripping agent KF650 (alcohol ester based anti-dripping agent) was 12 days when formulated in PE matrix (CE-7) and 15 days in EVA matrix (CE-8). The lifetime of one component PEO/PE anti-dripping agent was either similar to KF 650 (13 to 15 days for CE-2, CE-3 and CE-4) or worse than KF 650 (2 to 6 days for CE-1, CE-5 and CE6). The performance of another commercial available anti-dripping agent LA-6 was 14 days.

CE-10 contained 2 types of anti-dripping additives but no PEO/PE with a HLB value lower than 7. The life time of the film was only 14 days.

CE-11 contained 2 types of anti-dripping additives. One was hydrophobic C32-EO4 (HLB=4) and the other was KF650 but contained no PEO/PE. The performance of the film was 14 days.

CE-12 and CE-13 were comparative examples containing hydrophobic C32-EO4 and hydrophobic esters, with no hydrophilic PEO/PE in the film. The anti-dripping lifetime for these 2 films was very short, only lasted for a few days.

Inventive Examples

Inventive examples contained several types of PEO/PE copolymers, in which at least one component was poor water soluble (C50-EO5 or C32-EO4 with an HLB value of 4), and at least one water soluble PEO/PE component with an HLB value larger than 7. From the acceleration test at 60° C., the lifetime of any of the inventive examples was longer than 20 days, much longer than the one component comparative examples (CE-1 to CE-9) and the two component comparative examples (CE-10 and CE-11). The lifetime of IE-2 (C32-EO4/C32-EO10 blends) and IE-4 (C32-EO4/C18-EO4 blends) was longer than 40 days while that of IE-5 and IE-6 was longer than 50 days, more than 3 times longer than that of the best comparative examples.

What is claimed is:

1. A greenhouse film comprising:
   a) at least 93 wt. % of a polyolefin component comprising a mixture of linear low density polyethylene and low density polyethylene;
   b) from 1 to 5 wt. % of an additive comprising
      i) from 33-50 wt. %, based on the total amount in the additive, of a first polyethylene oxide/polyethylene copolymer having a HLB value in the range of from 1 to 6 and a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$
      wherein a is from 9 to 25 and b is from 1 to 10; and
      ii) from 50-67 wt. %, based on the total amount in the additive, of a second polyethylene oxide/polyethylene copolymer having a HLB value in the range of from 7 to 13 and a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$
      wherein a is from 9 to 25 and b is from 1 to 10.

2. A greenhouse film consisting essentially of:
   a) at least 93 wt. % of a polyolefin component comprising a mixture of linear low density polyethylene and low density polyethylene;
   b) from 1 to 5 wt. % of an additive comprising
      i) from 33-50 wt. %, based on the total amount in the additive, of a first polyethylene oxide/polyethylene copolymer having a HLB value in the range of from 1 to 6 and a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$
      wherein a is from 9 to 25 and b is from 1 to 10; and
      ii) from 50-67 wt. %, based on the total amount in the additive, of a second polyethylene oxide/polyethylene copolymer having a HLB value in the range of from 7 to 13 and a structure selected from the group consisting of $CH_3CH_2(CH_2CH_2)_aCH_2CH_2(OCH_2CH_2)_bOH$ and $CH_3CH_2(CH_2CH_2)_aCO(OCH_2CH_2)_bOH$
      wherein a is from 9 to 25 and b is from 1 to 10.

* * * * *